J. J. CRAVEN.
REFRIGERATING CHAMBER.
No. 175,939. Patented April 11, 1876.
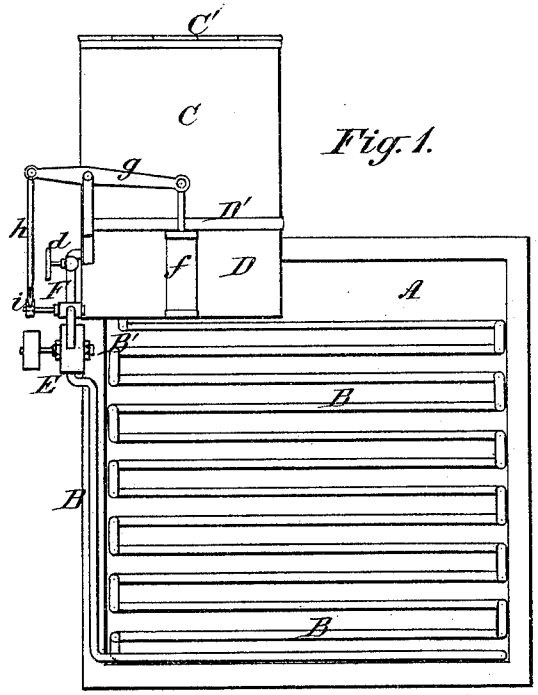
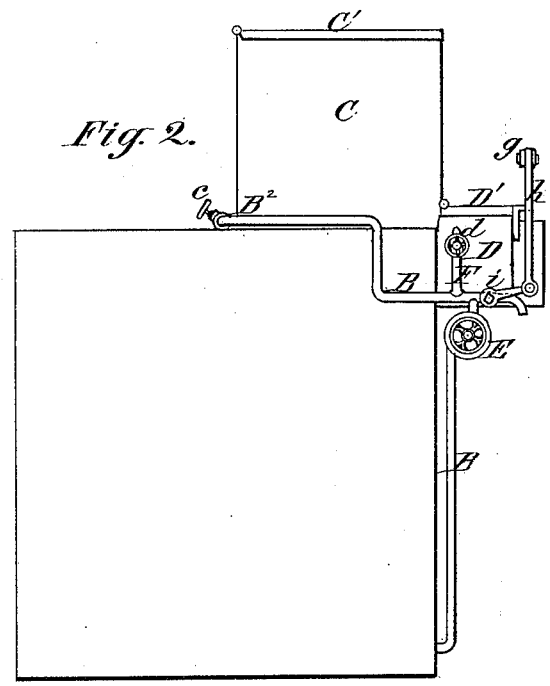
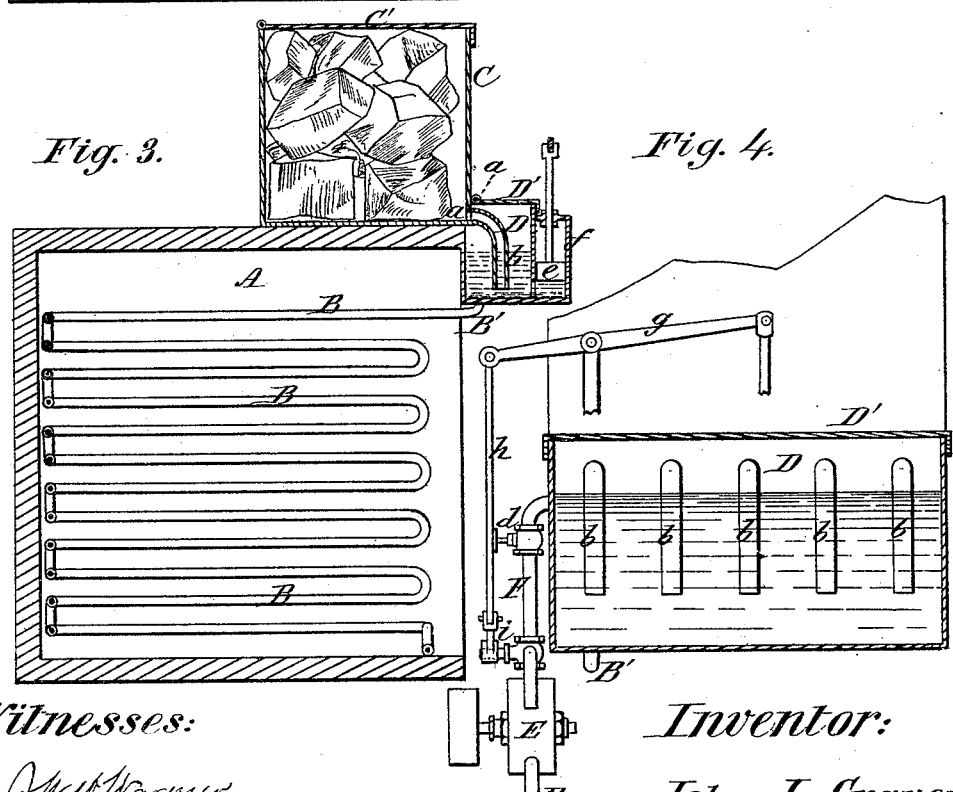
Witnesses:
Inventor:
John J. Craven,
by Johnson and Johnson
Atty's

UNITED STATES PATENT OFFICE.

JOHN J. CRAVEN, OF JERSEY CITY, NEW JERSEY.

IMPROVEMENT IN REFRIGERATING CHAMBERS.

Specification forming part of Letters Patent No. 175,939, dated April 11, 1876; application filed March 10, 1876.

*To all whom it may concern:*

Be it known that I, JOHN J. CRAVEN, of Jersey City, in the county of Hudson and State of New Jersey, have invented new and useful Improvements in Refrigerating Chambers, of which the following is a specification:

My object is to produce and hold the air of a preserving room or compartment at the lowest possible temperature, and in a condition free from moisture, as an essential object of my invention is to avoid direct contact of the air with ice, as it is important in order to effect a proper preservation of both animal and vegetable matter that the air be free or comparatively free from moisture. In my plan I employ a closed magazine for the storage of the ice, and a closed reservoir for the drainage therefrom, and this drainage or cold fluid I use as the only means of transmitting the low temperature of the ice to the refrigerating chamber. For this purpose circulation-pipes are connected with such intermediate closed reservoir, and the closed ice-magazine.

For obtaining the best results from this construction, I combine therewith means for producing and maintaining a circulation of the cold fluid in the refrigerating-pipes, and directly through a closed ice-magazine, whereby I am enabled to use the cooling fluid in a continuous or interrupted circuit, its returning passage through the closed ice-magazine serving to constantly renew its refrigerating properties. This circuit of the refrigerating fluid I effect by any suitable means—an ordinary pump being preferable. When the temperature of the preserving-chamber is reduced to the desired condition, then, as a matter of economy in the consumption of ice, it is desirable to interrupt the circuit by diverting the passage of the water from the closed magazine and yet maintain the circulation directly through the drainage-reservoir, and at the same time keeping intact the natural drainage from the closed ice-magazine into such reservoir. This isolation of the closed ice-magazine from the circuit is effected by a branch pipe and valve or cock connections with the circulating-pipes, and in this way I control and regulate the temperature of the chamber with an economical consumption of the ice; and my invention in this particular embraces a new system and adaptation of an economical and controllable circulation. I also combine with the closed drainage-reservoir and the circulation-pipes, an automatic float device whereby to discharge the surplus drainage from the floor-pipes.

To prevent the entrance of air into the ice-magazine from the drainage-reservoir, the communicating openings are provided with drop sealing-pipes opening near the bottom of the reservoir, and always below the level of the water therein, so that the ice-magazine is sealed at all points from the outside air, and the ice thereby kept from unnecessary waste, all of which will be more fully hereinafter explained, reference being had to the accompanying drawings, in which—

Figure 1 represents a front elevation of a refrigerating-chamber, with my invention applied thereto, the front side being removed to show the water-pipes; Fig. 2, a side elevation of the same; Fig. 3, a transverse section of the closed ice-magazine, its reservoir and cooling-chamber, and Fig. 4 a section of the reservoir, showing the sealed drainage-pipes from the magazine.

The preserving-chamber A is provided along its inner walls with a refrigerating circulation-pipe, B, arranged in any suitable manner that will produce the best effect. In any suitable position, I arrange a closed ice-magazine, C, in connection with this chamber, and combine with both a closed reservoir, D, to receive the drainage from the magazine, and for this purpose the reservoir D must be placed below the level of the bottom of the ice-magazine C, and provided with suitable communicating openings $a$, on a level with the floor of the ice-magazine.

As it is important that the ice-magazine be sealed from the outer air as much as possible, it is provided with an air-tight cover, C', in any suitable manner. The drainage-reservoir is also provided with a hinged cover, D', to afford facility for cleaning out and other purposes. As the drainage-openings $a$ enter into this reservoir, the air would pass through them into the ice-magazine, by reason of the more or less atmospherical agitation in the reservoir caused by the fluctuation and the impulse of the pump, and thereby increase the consumption of the ice. To prevent all entrance of air into the ice-magazine through said reservoir the drainage-openings $a$ are provided with drop-tubes $b$, which open within the reservoir near its bottom, and at a point always below the water-level, and serve thereby as seals to the magazine. The circulation of the drainage from the closed ice-magazine is effected by connecting the upper end $B^1$ of the refrigerating pipe or pipes B to the bottom of the drainage-reservoir, while the other end $B^2$ of such circulation pipe or pipes is carried up and connected with the bottom of the closed ice-magazine C, thus making a continuous circuit of the pipe throughout the walls of the cooling-chamber, with the closed reservoir and the closed ice-magazine in such circuit. Through this pipe B, by the aid of a proper motor, E, located in any convenient position upon said pipe, the circulation is maintained, regulated, and cut off by means of a suitable cock, $c$, in said pipe, the motor being driven in any suitable manner. This connection, however, only affords a direct circulation through the closed magazine, and in which the circulating medium is constantly brought into direct contact with the ice. As a matter of economy it is desirable at times to interrupt this direct circulation and simply put the drainage-reservoir D in the direct circuit. To effect this a branch pipe, F, from the circulation-pipe B, connects with the reservoir, and is provided with a suitable cock, $d$, which is then opened, while the cock $c$ at the magazine-connection must be closed. The closed ice-magazine is now isolated from the circulation, and contributes only to the reservoir the water that results from the simple thawing of the ice, while the circulation is kept up through the reservoir, and continued until it is found necessary to again bring the closed ice-magazine into the circuit to depress the temperature of the refrigerating-room.

A distinguishing feature of my invention is a continuous circulation of the cooling medium without outlet or exposure to the air; but as the fluid will increase beyond the capacity of the circulation-pipes and the drainage-reservoir, I combine with the latter means for effecting a discharge of the surplus water through a waste cock. As it would not be desirable or economical to discharge this surplus by an overflow directly from the reservoir, I provide the latter with a float, $e$, arranged in a side chamber, $f$, and connect the lever $g$ of such float $e$ by a rod, $h$, with a suitable cock, $i$, in the floor-pipe, above the pump, so that whenever the water in the reservoir reaches a given height the float $e$ will act by its connections to open the cock $i$ automatically. This arrangement gives the advantage of having the discharge at a point to gain the benefit of the cold of the waste in its rapid passage through the descending wall-pipes. As soon as the surplus is discharged the float descends and closes the cock $i$, and the ordinary circulation is again established.

Under this construction the discharge of the surplus drainage, and the cessation and resumption of the circulation, are automatic, while the direct and indirect circulation through the ice-magazine, the consumption of the ice, and the temperature of the refrigerating-chamber, are placed under the immediate control of the attendant, and the whole system rendered at once simple, comparatively inexpensive, and effective for the object designed.

It is obvious that the drainage-reservoir may be utilized as a receptacle for any of the usual cooling agents, whereby to effect a greater reduction of the temperature of the fluid in circulation, and in this way increase the refrigerating capacity beyond that of the immediate ice-drainage.

I claim—

1. For the purposes of refrigerating a preserving-chamber, the combination, with a system of circulating wall pipes, B, and a suitable circulating motor connected therewith, of a closed ice-magazine, C, and a drainage-reservoir, D, with both of which the circulation-pipes B are in direct communication to effect a continuous closed circuit through the magazine and the reservoir.

2. The combination, with a system of refrigerating wall-pipes, B, in a preserving-chamber, and a closed ice-magazine, C, of a closed drainage-reservoir, D, arranged intermediately between these parts, and provided with communicating openings $a$, and on a level with the floor of the ice-magazine, to receive the drainage therefrom and supply the refrigerating-pipes.

3. The combination, with a system of refrigerating wall-pipes, B, in a preserving-chamber, and a closed drainage-reservoir, D, separate from the ice-box, and with which, and the pipes, a suitable circulating motor connects, of a branch pipe, F, from the circulation pipes B, connecting with said reservoir, whereby to effect a continuous circulation of the drainage through the reservoir and the wall-pipes only.

4. The combination, with a system of refrigerating wall-pipes, B, in a preserving-chamber, a closed ice-magazine, C, a closed drainage-reservoir, D, and a suitable circulating motor, E, placed within the circuit of these parts, of the cocks $c$ and $d$, in the circulation and branch pipes B and F, whereby to effect, at will, a direct or indirect circulation of the cooling fluid, with regard to the closed ice-magazine.

5. The combination, with the closed ice-magazine C, the closed drainage-reservoir D, having openings $a$ communicating with the magazine, and the circulation-pipe B, of the drop sealing-tubes $b$ within the reservoir, for the purpose stated.

6. The combination, with the closed ice-magazine C, the drainage-reservoir D, and the circulation refrigerating-pipes B, of an automatic water-discharging device, for the purpose stated.

7. The method herein described of refrigerating a preserving-chamber, which consists in continuously forcing a fluid, cooled by contact with ice or a suitable freezing-mixture, in a continuous circuit through a system of channels within the preserving-chamber, through and in contact with the refrigerant, and through and in contact with the separated drainage therefrom, and alternately at will forcing such fluid through the same system of channels, and through and in contact with the separated drainage from the refrigerants, as set forth.

In testimony whereof I have affixed my signature in the presence of two witnesses.

JOHN J. CRAVEN.

Witnesses:
SAMUEL DEWEY,
C. P. HOPPS.